(12) United States Patent
Nanekar et al.

(10) Patent No.: US 8,793,371 B1
(45) Date of Patent: Jul. 29, 2014

(54) COMMON CONFIGURATION WAREHOUSE FOR A STORAGE SYSTEM

(75) Inventors: Ashutosh Nanekar, Cary, NC (US); Wadah Sayyed, Raleigh, NC (US); Hwai-Yeng Chan, Cary, NC (US); Joshua Hutt, Garner, NC (US)

(73) Assignee: EMC Corporation, Hopkinton, MA (US)

( * ) Notice: Subject to any disclaimer, the term of this patent is extended or adjusted under 35 U.S.C. 154(b) by 439 days.

(21) Appl. No.: 13/297,911

(22) Filed: Nov. 16, 2011

(51) Int. Cl.
*G06F 15/177* (2006.01)
*G06F 15/173* (2006.01)

(52) U.S. Cl.
USPC .......................................... 709/224; 709/220

(58) Field of Classification Search
USPC .................................. 709/220, 224
See application file for complete search history.

(56) References Cited

U.S. PATENT DOCUMENTS

| | | | |
|---|---|---|---|
| 5,890,204 A | 3/1999 | Ofer et al. | |
| 5,893,140 A | 4/1999 | Vahalia et al. | |
| 6,324,581 B1 | 11/2001 | Xu et al. | |
| 6,968,338 B1 | 11/2005 | Gawdiak et al. | |
| 7,555,569 B1 | 6/2009 | O'Hare | |
| 7,607,037 B1 * | 10/2009 | LeCrone et al. | 714/6.23 |
| 7,609,651 B1 | 10/2009 | McBride et al. | |
| 7,680,832 B1 | 3/2010 | Frank et al. | |
| 7,685,460 B1 * | 3/2010 | Bingham et al. | 714/6.11 |
| 7,716,684 B2 | 5/2010 | Singhal et al. | |
| 7,971,091 B1 | 6/2011 | Bingham et al. | |
| 7,984,131 B1 | 7/2011 | Gandhi et al. | |
| 8,046,477 B1 | 10/2011 | Arutla et al. | |
| 8,095,764 B1 | 1/2012 | Bauer et al. | |
| 8,112,451 B1 | 2/2012 | Graham et al. | |
| 8,468,241 B1 * | 6/2013 | Raizen et al. | 709/224 |
| 2002/0002661 A1 | 1/2002 | Blumenau et al. | |
| 2006/0026218 A1 * | 2/2006 | Urmston | 707/204 |
| 2009/0019535 A1 * | 1/2009 | Mishra et al. | 726/12 |
| 2013/0024494 A1 * | 1/2013 | Guarrieri | 709/203 |

OTHER PUBLICATIONS

EMC® Atmos™ Virtual Edition with EMC® VNX™ Series Deployment Guide, Oct. 2011, 79 pages, EMC Corporation, Hopkinton, MA.
VMware vStorage APIs for Array Integration With EMC VNX Series for SAN, White Paper, Sep. 2011, 19 pages, EMC Corporation, Hopkinton, MA.
EMC Plug-Ins for VMware vCenter, Aug. 10, 2010, 5 pages, EMC Corporation, Hopkinton, MA.
EMC Storage Configuration Advisor, Data Sheet, Jan. 2011, 3 pages, EMC Corporation, Hopkinton, MA.

(Continued)

*Primary Examiner* — Larry Donaghue
(74) *Attorney, Agent, or Firm* — Richard Auchterlonie; Novak Druce Connolly Bove + Quigg LLP

(57) ABSTRACT

Configuration information from multiple sources about hardware and software of a storage system are collected and stored in a configuration database having an extensible framework. Common application program interfaces (API) are provided for storage utility applications to access the configuration database. A backup and restore engine collects and stores the configuration information at periodic intervals or on demand, maintains prior versions of the stored information in an archive, and restores the storage system with a selected version. A distributor engine applies format conversion and filtering to produce diagnostic bundles of configuration information for multiple utility applications. A graphical user interface provides an administrator with a set of tools for operating the backup and restore and distributor engines and for viewing, dumping, comparing, and validating the contents of selected versions in order to diagnose and solve configuration problems.

20 Claims, 7 Drawing Sheets

(56) References Cited

OTHER PUBLICATIONS

Ensuring Material eXchange Format Assets' Availability with EMC AVALONidm, White Paper, Sep. 2007, 8 pages, EMC Corporation, Hopkinton, MA.

Brady, Tim, et al., editors, "Extensible Markup Language (XML) 1.0 (Fifth Edition)," W3C Recommendation Nov. 26, 2008, 38 pages, The World Wide Web Consortium (W3C), MIT, Cambridge, Mass.

Crockford, D., The application/json Media Type for JavaScript Object Notation (JSON), RFC 4627, Jul. 2006, 11 pages, The Internet Society, Reston, VA.

Maluf, David A., et al., An Extensible 'Schema-less' Database Framework for Managing High-Throughput Semi-Structured Documents, IASTED Conference on Computer Science & Technology (CST), Cancun, Mexico, Conference Proceedings, 2003, 6 pages, The International Association of Science and Technology for Development, Calgary, Alberta, Canada.

Pereira, Levi, Monitoring the Cluster in Real Time with CHM (Cluster Health Monitor), blog at worldpress.com, Jul. 19, 2011, 10 pages, Automattic Inc., San Francisco, CA.

Michalewicz, Markus, Everything you ever wanted to know about the Cluster Health Monitor, May 10, 2011, 40 pages, Oracle Corporation, Redwood Shores, CA.

Cluster Health Monitor, ILINUX Kernel DBD Readme, May 3, 2011, 9 pages, Oracle Corporation, Redwood Shores, CA.

\* cited by examiner

COMMON CONFIGURATION WAREHOUSE FOR A STORAGE SYSTEM

FIELD OF THE INVENTION

The present invention relates generally to storage systems, and more particularly to software applications for storage systems. The present invention more particularly relates to collection and preservation of configuration information for a storage system in order to reduce maintenance of redundant copies of system configurations, and reduce overall software development effort and maintenance work for various software applications of the storage system.

BACKGROUND OF THE INVENTION

Various makes and models of storage systems are manufactured and sold for a variety of customers, ranging from individual households and small businesses, to large businesses and government agencies. Typically a "high end" storage system for an enterprise such as a large business or government agency has a file server architecture that can be configured to supply a given number of clients with various classes and capacities of file data storage.

A specific configuration of a storage system model may also have selected software components. A given storage system model may have a particular version of firmware and a particular version of an operating system layered on the firmware. Typically a variety of software utility applications are provided for service and maintenance so that system administration can be done locally by the owner of the enterprise or remotely by the storage system vender. The utility applications include system level backup and recovery tools, system support and diagnostic tools, system reporting tools, and system statistics tools. The utility applications also include tools for operating upon client files such as anti-virus tools, backup and archiving tools, query tools and filters, formatting and indexing tools, compression tools, and encryption tools.

When executed on a particular storage system, many of the utility applications require knowledge of the specific configuration of the particular storage system. Therefore, such a utility application must be coded, linked, or loaded with configuration data about the particular storage system, or such a utility application must access the configuration data when the utility application is executed. In addition, such a utility application may be built upon more basic software layers in the storage system. Therefore, a utility application for the storage system may require configuration data from a variety of sources, such as hardware configuration data, firmware and operating system configuration data, application level configuration data, and runtime data from event logs and from the collection of statistics.

For example, the EMC Corporation VNX brand of storage system has four different utility applications that collect configuration information for various serviceability use cases. The utility applications include a configuration backup tool to backup data mover configuration, a diagnostic collection tool to collect system configuration information for Escalation Engineering (EE) troubleshooting purposes, a configuration log tool to collect system configuration information for engineering system reporting purposes, and a tool to collect system connectivity environment information regarding the connections between data movers and backend storage arrays. Each of these tools collects certain configuration information and stores the collected configuration information in a respective different database for each tool. The sources of the configuration information are located in certain logical unit numbers (LUNs) of the backend storage, which are dedicated to storage of file server control information. These sources of configuration information include a system database for the file systems accessible to network clients through the data movers, a NAS configuration data base and logs about the hardware configuration of the file server and its backend SAN environment, and data mover dumps into a staging area in one of the LUNs.

SUMMARY OF THE INVENTION

The inventors have discovered that the current method of collecting system configuration information is a bottleneck to the development and maintenance of software for a storage system. The current method has each software utility application collecting the configuration information from different sources in various private formats so that the collected information cannot be shared easily or leveraged by other utility applications. The lack of a consistent configuration information collection method has resulted in redundant software development and maintenance work, which extends time-to-market release plans. In addition, duplicate software collecting the same configuration information introduces excessive and undesirable CPU, memory, and disk space consumption.

In accordance with one aspect, the invention provides a method of managing configuration information in a network storage environment. The method includes a data processor of a storage system executing computer instructions stored on a non-transitory computer readable storage medium to perform the steps of: (a) collecting dynamic and static configuration information about hardware and software of the storage system from multiple sources in the storage system; (b) storing the collected configuration information in a configuration database in storage of the storage system; (c) providing common application program interfaces (API) for utility applications to access the configuration database; (d) creating configuration backup bundles from the configuration information in the configuration database for restoration or repair of the storage system; and (e) creating different kinds of diagnostic bundles of the collected configuration information for input to different utility applications for different serviceability use cases.

In accordance with another aspect, the invention provides a computer program product including a non-transitory computer readable storage medium storing computer instructions. When executed by a data processor of a storage system, the computer instructions perform the steps of: (a) collecting dynamic and static configuration information about hardware and software of the storage system from multiple sources in the storage system, (b) storing the collected configuration information in a configuration database in storage of the storage system, (c) providing common application program interfaces (API) for storage utility applications to access the configuration database; (d) creating configuration backup bundles from the configuration information in the configuration database for restoration or repair of the storage system; and (e) creating different kinds of diagnostic bundles of the collected configuration information for input to different utility applications for different serviceability use cases.

In accordance with another aspect, the invention provides a storage system. The storage system includes at least one array of data storage devices, and at least one server computer coupled to the array of data storage devices for servicing client requests for access to data stored in the array of data storage devices. The data storage system includes a data processor, and non-transitory computer readable storage medium coupled to the data processor and storing computer instructions. The computer instructions, when executed by the data processor, perform the steps of: (a) collecting dynamic and static configuration information about hardware and software of the storage system from multiple sources in the storage system; (b) storing the collected configuration information in a configuration database in storage of the storage system; (c) providing common application program interfaces (API) for utility applications to access the configuration database; (d) creating configuration backup bundles from the configuration information in the configuration database for restoration or repair of the storage system; and (e) creating different kinds of diagnostic bundles of the collected configuration information for input to different utility applications for different serviceability use cases.

BRIEF DESCRIPTION OF THE DRAWINGS

Additional features and advantages of the invention will be described below with reference to the drawings, in which.

Figure 1:
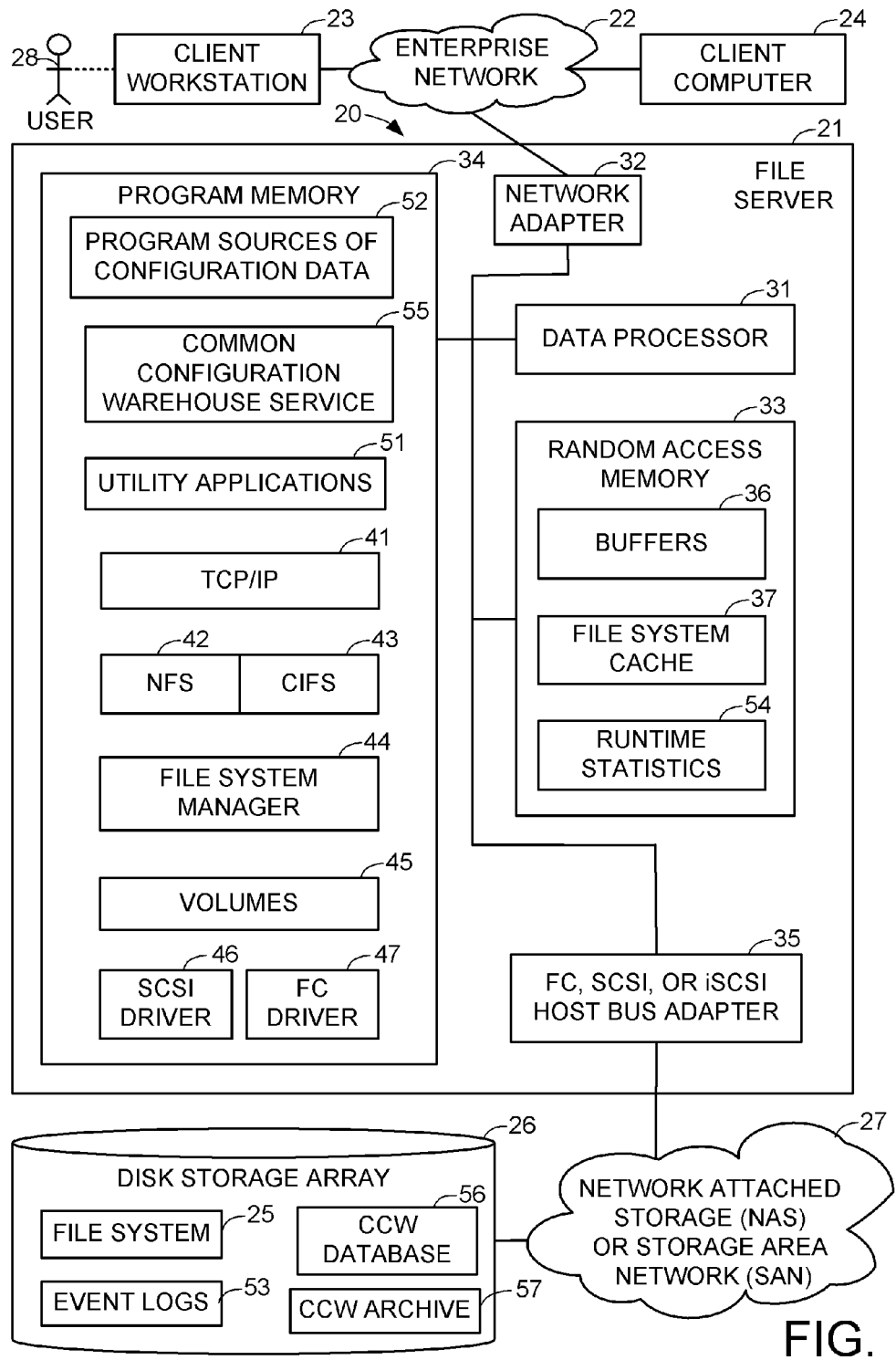
FIG. 1 is a block diagram of a storage system including a network server computer in an enterprise network.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

The preferred embodiments concern storage systems of various kinds, each of which includes a database of configuration information of the storage system, and a common configuration warehouse service. The common configuration warehouse service is a computer program of computer instructions executed by a data processor in the storage system. The storage system generally includes one or more arrays of storage devices and one or more server computers. In a storage system having a single server computer, it is most convenient for the common configuration service to be executed in this single network server computer. Such a storage system 20 is shown in FIG. 1.

Figure 4:
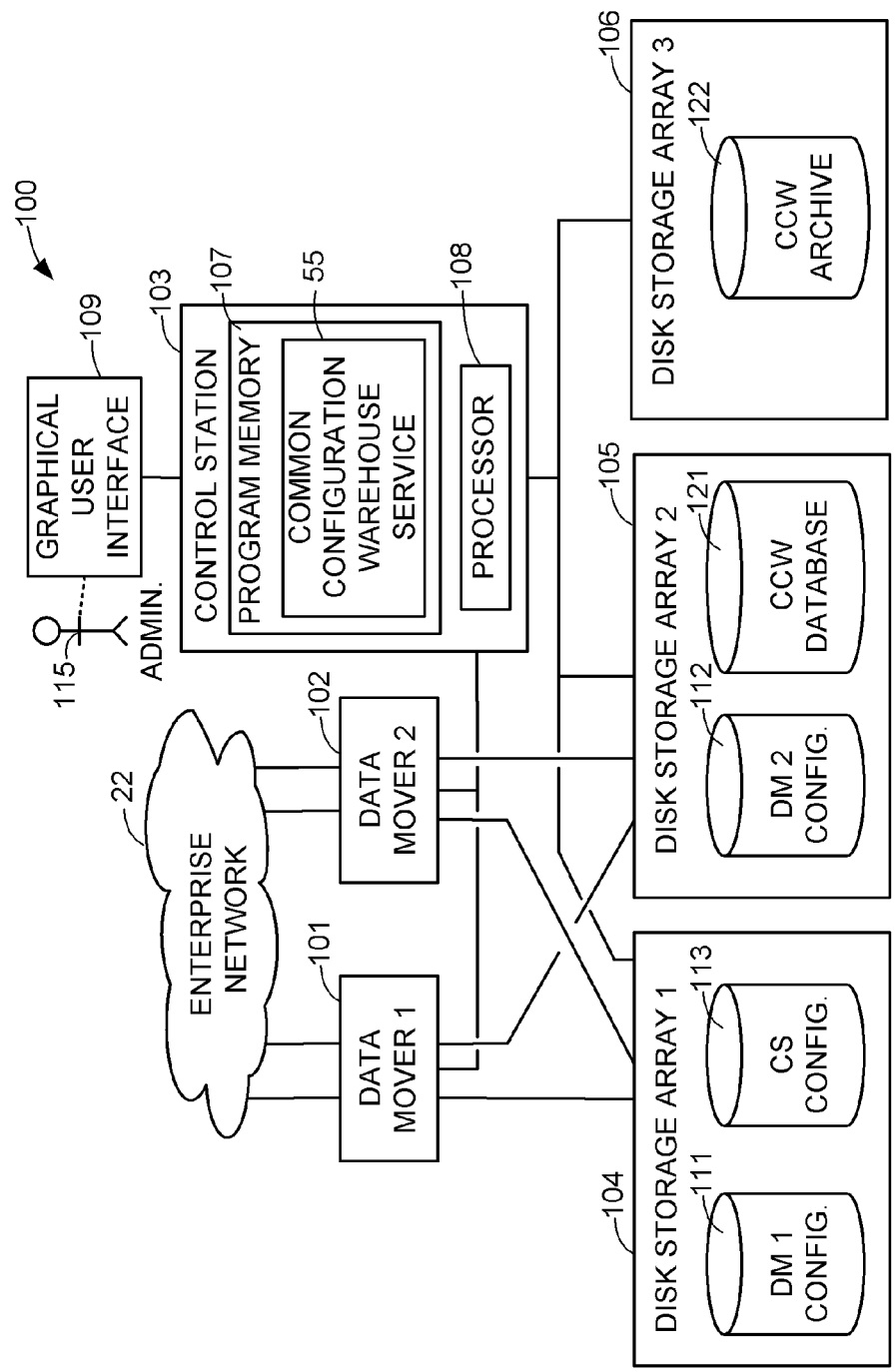
FIG. 4 is a block diagram of a network storage system including a control station, data movers, and disk storage arrays.

In a storage system having more than one server computer, the common configuration warehouse service could be executed in any one or more of the server computers. If the storage system has more than one server computer and a separate control computer that is responsible for configuration and control of the server computers, then it is convenient for the common configuration warehouse service to be executed in the control computer. Such a storage system 100 is shown in FIG. 4. In a preferred implementation, the same common configuration warehouse service 55 is suitable for being loaded into the server computer 21 of the storage system 20 shown in FIG. 1, or being loaded into the control computer 103 of the storage system 100 of FIG. 4.

The storage system 20 in FIG. 1 includes the server computer 21 in an enterprise network 22, and a disk storage array 26 accessed by the server computer 21. In this example, the server computer 21 is a network file server for providing network clients 23, 24 with shared access to a file system 25 in the disk storage array 26. The client 23 is a workstation of a human user 28. The client 24 is an application server computer.

A network 27 links the disk storage array 26 to the file server 21 in a network attached storage (NAS) or a storage area network (SAN) configuration. The disk storage array 26 typically is an array of magnetic disk storage devices. Other kinds of data storage devices could be used in lieu of magnetic disk storage devices, such as solid-state disk devices, optical disk devices, and magnetic tape cartridges.

The file server 21 includes a data processor 31, a network adapter 32 linking the data processor to the enterprise network 22, random access memory 33, program memory 34, and a Fibre-Channel (FC), Small Computer System Interface (SCSI), or Internet SCSI (iSCSI) host bus adapter 35. The data processor 31 is a general purpose digital computer data processor including one or more core central processing units (CPUs) for executing computer program instructions stored in the program memory 34. The random access memory 33 includes buffers 36 and a file system cache 37.

The program memory 34 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The program memory 34 includes a stack of program layers for responding to requests from the network clients 23, 24 for access to files in the shared file system 25. These program layers include a network communication layer 41 supporting communication using the Transmission Control Protocol over the Internet Protocol (TCP/IP), network file access protocol layers 42, 43, a file system manager 44, a logical volumes layer 45, an SCSI driver 46, and a Fibre-Channel driver 47. The network file access protocol layers 42, 43 include a program module 42 for clients using the Network File System (NFS) protocol, and a program module 43 for clients using the Common Internet File System (CIFS) protocol. The file system manager 44 maintains the file system cache 37 in the random access memory 33 and maintains the shared file system 25 in the disk storage array 26. For example, files are constructed and organized into a UNIX-based file system built upon a logical volume of storage, as further described in Uresh Vahalia, Unix Internals—The New Frontiers, Chapter 9, File System Implementations, pp. 261-290, Prentice-Hall, Inc., Upper Saddle River, N.J. (1996).

The program memory 34 also includes various utility applications 51. When executed by the data processor 31, many of the utility applications require access to configuration data. The configuration data includes program sources 53 of configuration data, such as firmware modules and operating system modules. The configuration data also includes data in event logs 53 in the disk storage array 26, and runtime statistics 54 collected and stored in the random access memory 33. For example, the runtime statistics include the total number of kilobytes read, and the total number of kilobytes written, for NFS clients, and for CIFS clients.

In the file server 21, the utility applications 51 have been modified so that they access configuration data from a common configuration warehouse (CCW) service 55. The common configuration warehouse service 55 collects and preserves common system configuration information in an extensible framework to maintain overall versioning and attribute level versioning for backward compatibility and inter-operability. Such an extensible framework allows clients to access the system configuration information based on different published CCW schemas through a version-based application program interface (API). For example, the Extensible Markup Language (XML) format can be used to implement a version-based API. XML, is defined in Tim Brady et al., editors, "Extensible Markup Language (XML) 1.0 (Fifth Edition)," W3C Recommendation 26 Nov. 2008, The World Wide Web Consortium (W3C), MIT, Cambridge, Mass. For example, a particular volume of storage in the disk storage array 26 is defined in the CCW schema using the following XML format:

<?xml version="1.0" encoding="UTF-8" ?>
-<APLTask description="Volume Data"
   baseType="Config">
-<Data>
   <Volume id="52251" mover="1"
   lun="60060160c37b2500fa0d36eb1639df11"
   size="10240"
   path="c0t1l0"/>
   </Data>
</APLTask>

Another suitable format for CCW schema is the JavaScript Object Notation (JSON) format. In this case the schema is described in name/value pairs and an ordered list of values. JSON is defined in D. Crockford, "The application/json Media Type for Javascript Object Notation (JSON), RFC 4627, July 2006, The Internet Society, Reston, Va.

In any case, the extensible framework provides a framework for defining new kinds of storage system configuration components so that configuration information about the new kinds of storage system configuration components can be added to the CCW database 56 and processed by the common configuration warehouse service 55.

In addition, as configuration changes occur, the common configuration warehouse service 55 updates the common system configuration information in an on-disk CCW database 56 in such a way as to generate a consistent backup and restore of the common system configuration information upon shutdown and re-boot of the file server 21. Therefore, the CCW database 56 provides a most convenient and reliable way of recovering from a loss of configuration data from an original source of this configuration data.

For example, the CCW database 56 is updated using a transaction logging technique so that any inconsistency in the CCW database due to a shutdown and re-boot of the file server can be resolved by inspection of an event log. For example, when a configuration change occurs, a configuration change event is recorded in one of the event logs 53, and then the CCW database 56 is updated. Upon re-boot of the file server, the last logged configuration change event is re-done upon the CCW database so that the CCW database is maintained in a consistent state.

For system recovery and diagnostic purposes, the common configuration warehouse service 55 also maintains a CCW archive 57 of snapshot copies of the configuration information existing in the CCW database 56 at various times in the past. For example, if the configuration information in the CCW database 56 becomes corrupted and cannot be restored from the original sources of configuration information in the file server, then the configuration information in the CCW archive 57 is inspected to find the most recent snapshot, and the CCW database 56 and the original sources of configuration information are restored with the configuration information from this most recent snapshot.

Figure 2:
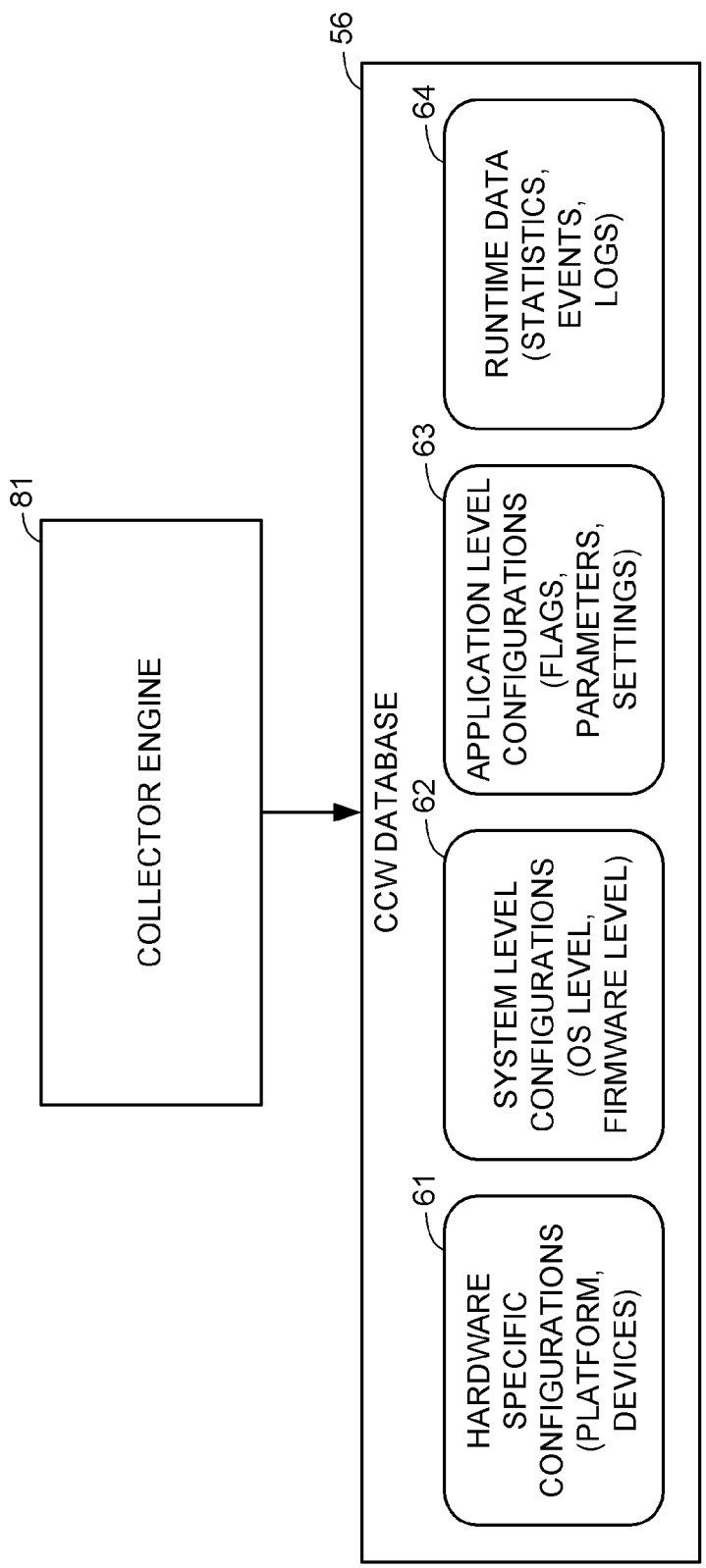
FIG. 2 is a block diagram of a collector engine and a common configuration warehouse (CCW) database of various kinds of system configuration information collected from the storage system of FIG. 1.

FIG. 2 shows that the CCW database 56 is designed to improve the development and maintenance of software for storage systems. In this example, four different kinds of utility programs require access to the configuration information in the CCW database 56. The configuration information includes hardware specific configurations 61 of the platform and various devices such as network adapters, disk adapters, and disk drives. The configuration information also includes system software configurations 62 such as the operating system (OS) level and the storage system firmware level. The configuration information also includes software application configurations 63 such as parameters and settings for the application programs. The configuration information also includes runtime data 64 such as statistics, events, and logs. A collector engine 81 collects the configuration information from various applications of the storage system and from the devices attached to the storage system, and stores the collected configuration information in the CCW database 56.

Figure 3:
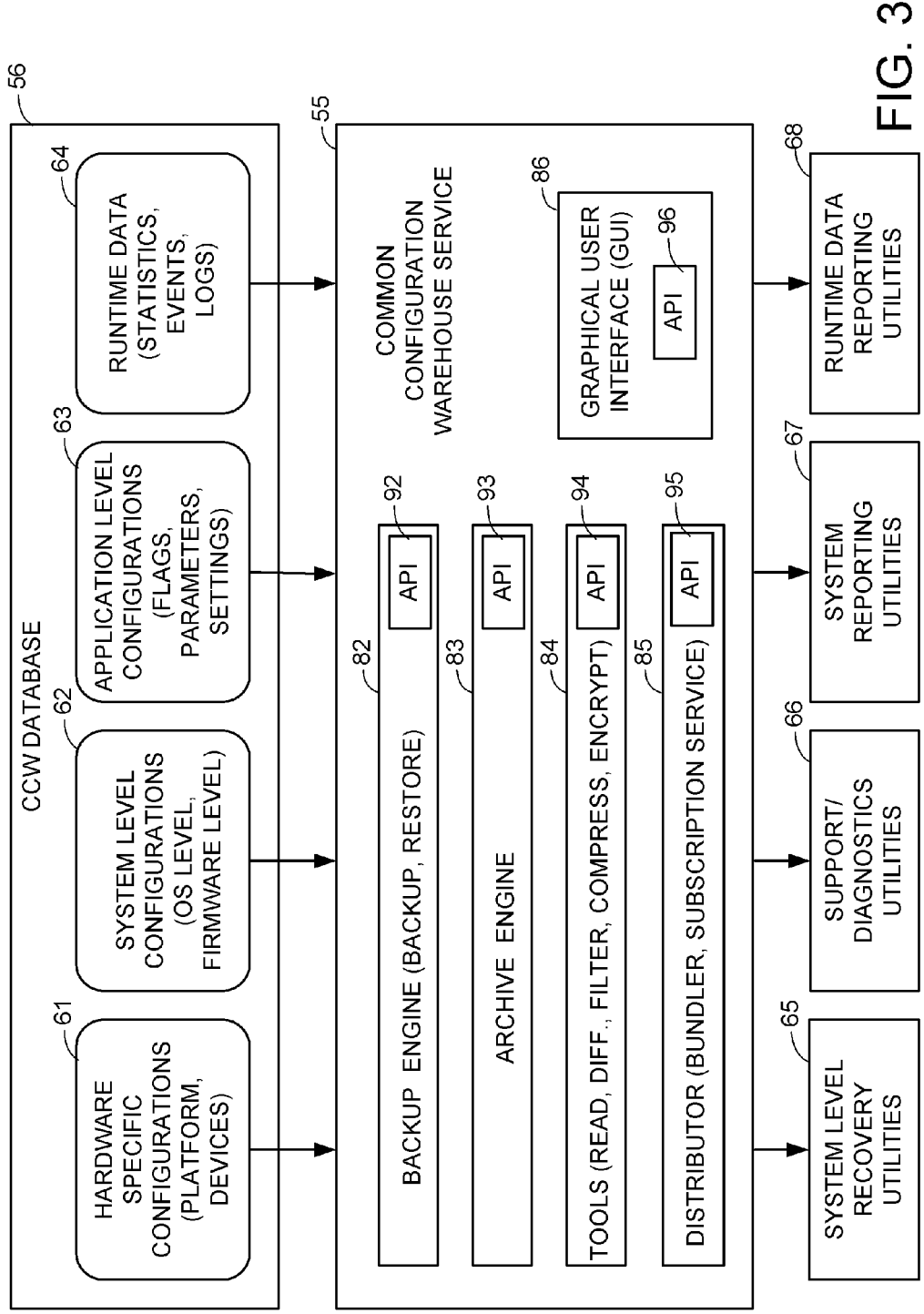
FIG. 3 is a block diagram showing a common configuration warehouse service providing utility programs with access to the common configuration warehouse database.

As shown in FIG. 3, four different examples of utility programs 65, 66, 67, and 68 invoke the common configuration warehouse service 55 in order to access the configuration information in the CCW database 56. The common configuration warehouse service 55 centralizes access to the configuration information and provides a way for the utility programs to share the configuration information. The common configuration warehouse service 55 is extensible and scalable for future code expansion. Also, it protects the utilities against incremental software modification each time that a source of configuration information modifies or adds to the kind of configuration information that it produces.

By using a framework for the configuration information in the CCW database 56 and by using common interfaces for accessing the CCW database 56, data access compatibility is guaranteed across the utility applications so that the users do not see different interpretations of the configuration information. The framework and the common interfaces are easily modified to account for new kinds of configuration information while maintaining backward compatibility with archived versions of the configuration information.

The preferred framework for the configuration information provides functionality to transform to or from various XML, JSON, text, or binary formats, and to maintain overall and attribute level versioning for backward compatibility and inter-operability. The framework for the configuration information also permits the configuration information from the multiple sources and from the different versions in the archive to be correlated in order to help the administrator manage the storage system more efficiently. For example, the ability to correlate the runtime statistics and events to the other configuration information is helpful to address performance degradation and in particular to determine whether performance degradation should be addressed by adding processors, network adapters, storage adapters, cache memory, or disk drives to the storage system.

As further shown in shown in FIG. 3, the utility programs include system level recovery utilities 65, support or diagnostic utilities 66, system reporting utilities 67, and runtime data reporting utilities 68. The programs of the common configuration warehouse service 55 that access the configuration information from the CCW database 56 include a backup engine 82, an archive engine 83, a set of tools 84, and a distributor 85.

The backup engine 82 provides backup and restore of the file server with the configuration information found in the CCW database 56 or the CCW archive 57. The administrator may configure the backup engine 82 for an hourly, weekly, or monthly backup interval and for a specified number of backup copies over the selected backup interval.

The archive engine 83 provides centralized storage of archive copies of the configuration information in the CCW database 56. In a preferred implementation, the CCW database 56 and the CCW archive 57 use a standard open source relational database that permits access to the stored configuration information using standard query language (SQL) by internal CCW components. For example, the database is PostgreSQL from the PostgreSQL Global Development Group.

The tools 84 include tools for reading the CCW database 56, finding differences between specified versions of the CCW database 56, filtering configuration information from a version of the CCW database, compressing the configuration information for storage or uncompressing configuration information read from storage, and encrypting configuration information to be stored or decrypting configuration information read from storage. The filter tool can be used for creating different kinds of diagnostic bundles including the configuration data of selected file server objects and selected elements or attributes of the selected objects. The filter tool can also be used to remove sensitive customer data from a diagnostic bundle. For example, the filter tool can exclude data from specified files, such as an "export" file identifying network clients. The filter tool can also be used to create a summary of the current configuration in the CCW database 56 including selected details of particular interest.

The distributor 85 produces configuration information bundles for various utilities, such as a backup bundle to be put in the CCW database for system restore, a bundle for network storage design, a bundle for field development analysis, and a bundle for troubleshooting purposes. The distributor 85 also has a subscription mechanism such that either internal or external applications will receive notifications when there is a change to specified configuration information.

The common configuration warehouse service 55 also has a graphical user interface (GUI) 86 for permitting an administrator to invoke the various routines, as further described below with reference to FIG. 5.

The various program routines 82, 83, 84, 85, 86 of the common configuration warehouse service 55 have respective application program interfaces (API) 92, 93, 94, 95, 96 for access by other programs such as the utilities 65, 66, 67 and 68. The APIs 92, 93, 94, 95, 96 provide the common interfaces for the utility programs 65, 66, 67, 68 to access CCW database 56. Therefore the utility programs 65, 66, 67, 68 call the APIs instead of directly accessing the CCW database 56, and the utility programs also call the APIs to invoke selected functions of the various program routines 82, 93, 94, 85, 86 in the common configuration warehouse service 55.

For example, the utility programs call the API 94 of the tools 84 for reading and filtering selected configuration information from the CCW database 56, and call the API 93 of the backup engine 92 to store a snapshot copy of the configuration information, and call the API 93 of the archive engine 83 to recall a snapshot copy of the configuration information, and call the API 95 of the distributor 85 to obtain a selected backup bundle, and call the API 96 of the GUI 85 to get pictures (such as graphics interchange format files) of selected configuration information and analysis. In this fashion, similar API calls are replicated among the different kinds of utilities 65, 66, 67 and 68 to replace what otherwise would be different routines in each utility for directly accessing the original sources of the system configuration information and for basic processing and analysis of the system configuration information. This reduces the overall software development effort and maintenance work for the different kinds of utilities 65, 66, 67 and 68.

FIG. 4 shows a file server 100 having a more complex hardware configuration. In this example, the file server 100 includes a first data mover 101, a second data mover 102, a control station computer 103, a first disk storage array 104, a second disk storage array 105, and a third disk storage array 106. In this example, each data mover 101, 102 is a server computer similar to the file server 21 in FIG. 1, except that the common configuration warehouse service 55 is not included in the data movers 101, 102. Instead, the common configuration warehouse service 55 is included in program memory 107 of the control station computer 103 and executed by a processor 108 of the control station computer. In practice, each data mover 101, 102 is built on a separate computer motherboard or server blade. Each data mover can also be configured to appear as a number of separate virtual servers in the enterprise network 22. Further details regarding the data movers are found in Vahalia et al., U.S. Pat. No. 5,893,140, incorporated herein by reference, and Xu et al., U.S. Pat. No. 6,324,581, issued Nov. 27, 2001, incorporated herein by reference.

The control station computer 103 has a graphical user interface (GUI) 109 for a human administrator 115 to configure and monitor operation of the file server 100. A conventional laptop computer can be programmed to serve as the graphical user interface 109.

In the file server 100 of FIG. 4, the conventional configuration database 111 of the first data mover 101 is stored in the first disk storage array 104, the conventional database 112 of the second data mover 102 is stored in the second disk storage array 105, and the conventional configuration database 113 for the control station computer 103 is stored in the first disk array 104. A CCW database 121 is stored in the disk storage of the second disk storage array 105. A CCW archive 122 is stored in the third disk storage array 106.

Figure 5:
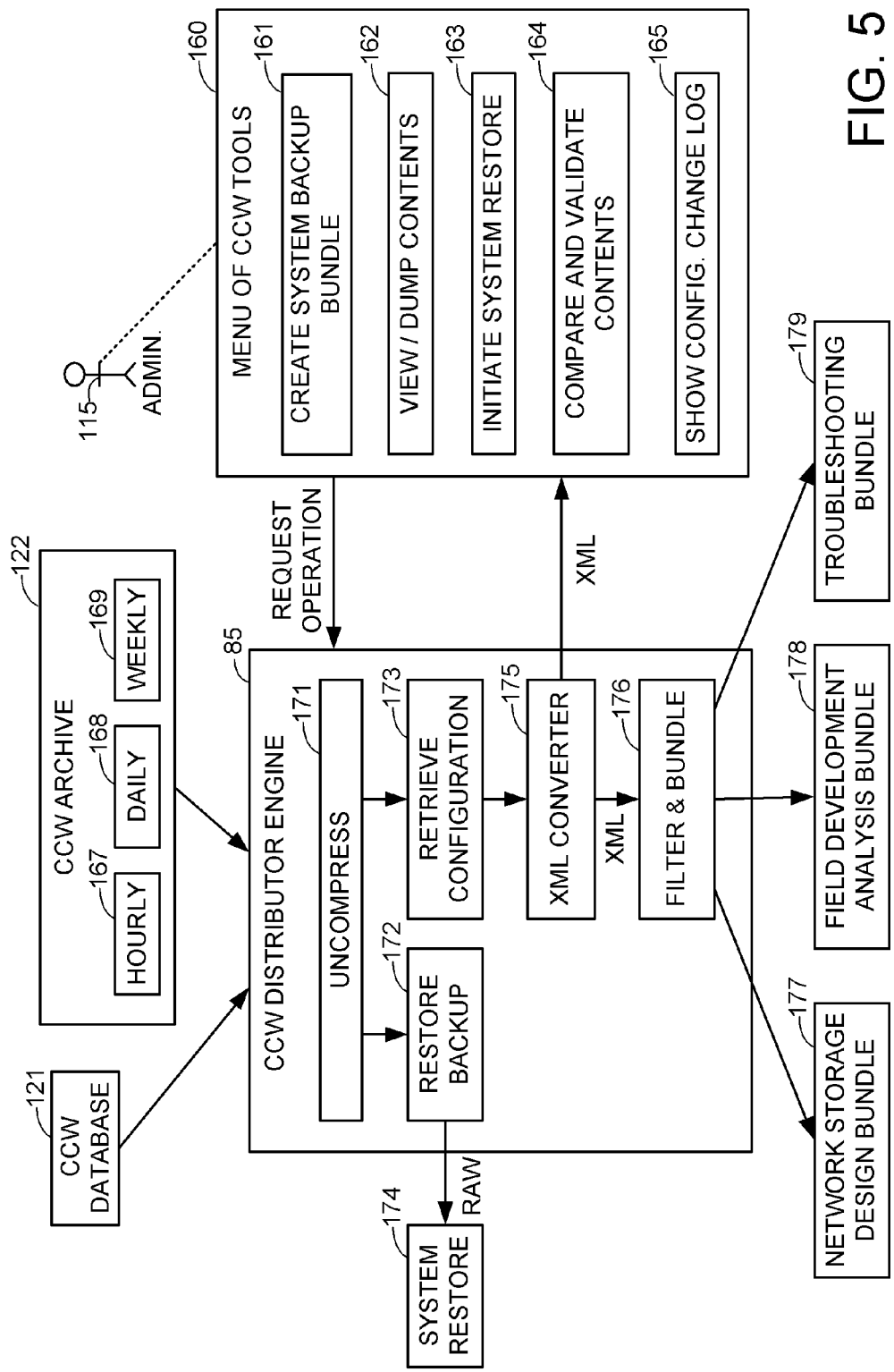
FIG. 5 is a block diagram showing how a distributor engine of the common configuration warehouse service performs functions selected from a menu of tools.

FIG. 5 shows the administrator 115 using a menu of CCW tools 160 provided by the graphical user interface (109 in FIG. 4) of the control station (109 in FIG. 4). The menu of CCW tools 160 includes a list of functions for selection by the administrator. These functions include create system backup 161, view/dump contents 162, initiate system restore 163, compare and validate contents 164, and show configuration change log 165. In response to the administrator 115 selecting a function on the menu 160, for example by a mouse click or scrolling down through the list and striking a key, a request to perform the function is sent to the distributor engine 85.

The view/dump contents 162 function can display the contents in multiple supported formats. The contents can be displayed for the control station or a selected data mover, or all the contents can be displayed at once.

The compare and validate contents function 164 can show changes between two specified configuration backups and also create a report of the changes. The compare and validate contents function 164 can also be performed in background when the collector creates a new collection of configuration information so that the "show config. change log" function 165 is able to supply a report of the changes to the new configuration as soon as the CCW database 121 is updated. The compare and validate contents function 164 also provides validity and consistency checking to flag changes that are found to be invalid or inconsistent, and to recommend that changes found to be invalid or inconsistent should be replaced with the corresponding configuration information in a prior version that has not been found to be invalid or inconsistent.

The create system backup function 161 can be used to create backup bundles for a specific point in time.

Most of the functions in the menu 160 are performed on the current configuration in the CCW database 121 or a past configuration in the CCW archive 122 as selected by the administrator 115. For example, by default, every hour the current configuration in the CCW database 121 is moved to the CCW archive 122 and a new backup is created and put in the CCW database. The backups in the CCW archive 122 are stored in hourly, daily, and weekly folders 167, 168, 169, and kept in the folders for an amount of time dependent on retention policy driven from user input.

Configuration information read from a selected backup is processed by an uncompress function 171 to perform a restore backup function 172 or a retrieve configuration function 173. The restore backup function 172 provides raw configuration data for a system restore 174. The retrieve configuration function 173 provides configuration data to an XML converter 175 so that configuration data in XML format is returned to the graphical user interface for display to the administrator 115 or supplied to a filter and bundle function 176. Instead of XML, another kind of data interchange format could be used such as JavaScript Object Notation (JSON) or comma-separated values (CSV). The filter and bundle function 176 uses the configuration data to create a network storage design bundle 177 used to adapt the storage system to the needs of a customer, or a field development analysis bundle 178 used to determine what features are used by customers and how features used by customers are configured, or a troubleshooting bundle 179 used for diagnosing and solving problems with the configuration of the storage system. The bundles 177, 178, 179 differ in the content and detail of the configuration information because the bundles are used for these different purposes.

In addition to the tools menu 160, the administrator 115 can also invoke the CCW distributor engine 85 by sending control commands to the control station via a command line interface. For this purpose, the command line interface of the control station is programmed to recognize a new "ccw_tool" command and to call application program interfaces (API) of the distributor engine 85 to perform one or more of the CCW tool functions (161, 162, 163, 164, 165) as selected by parameters of the "ccw_tool" command.

Figure 6:
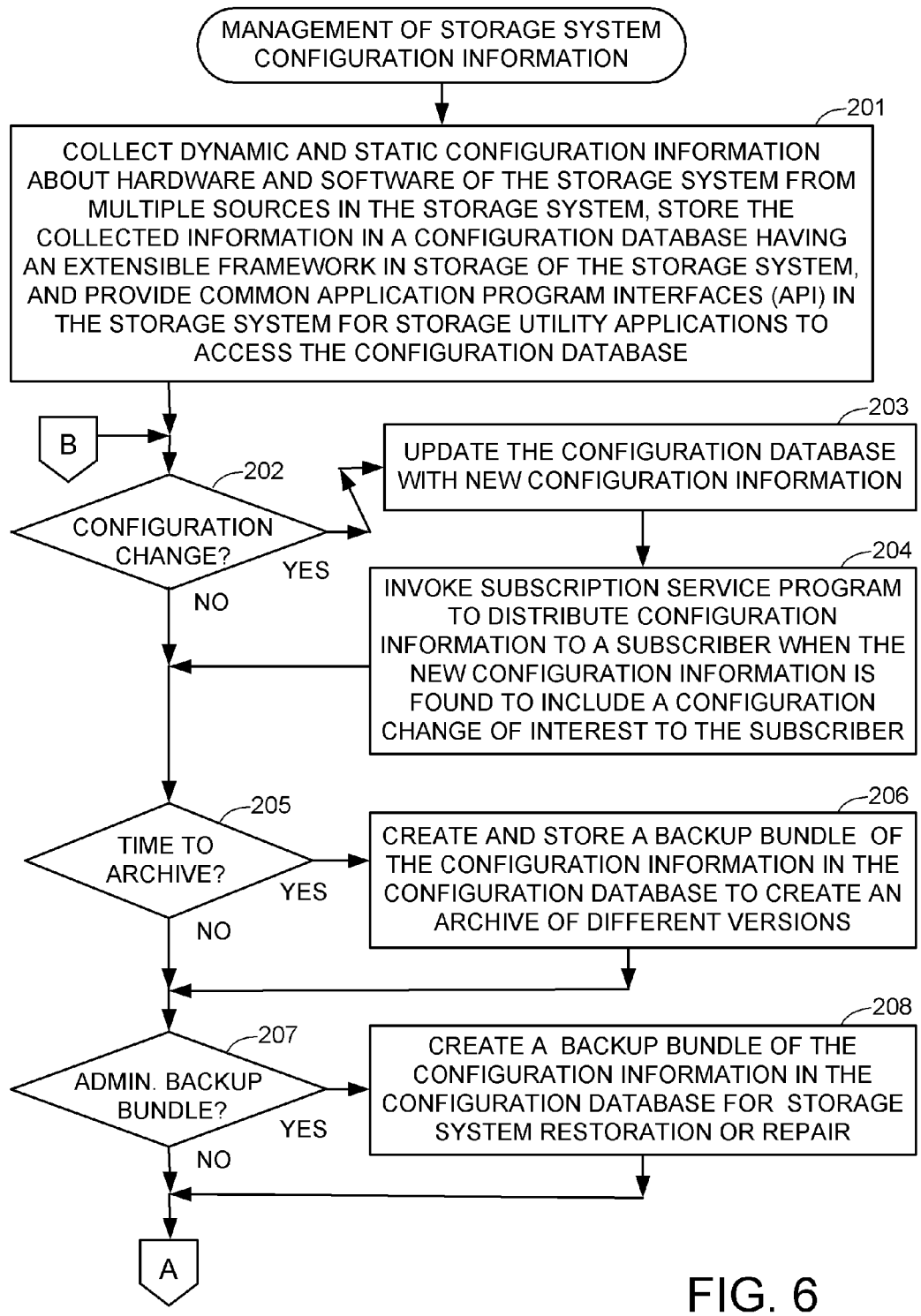
FIGS. 6 and 7 together comprise a flowchart of a method of using the common configuration warehouse service to collect, store, and archive the system configuration information, and to retrieve and use the system configuration information for various purposes.
Figure 7:
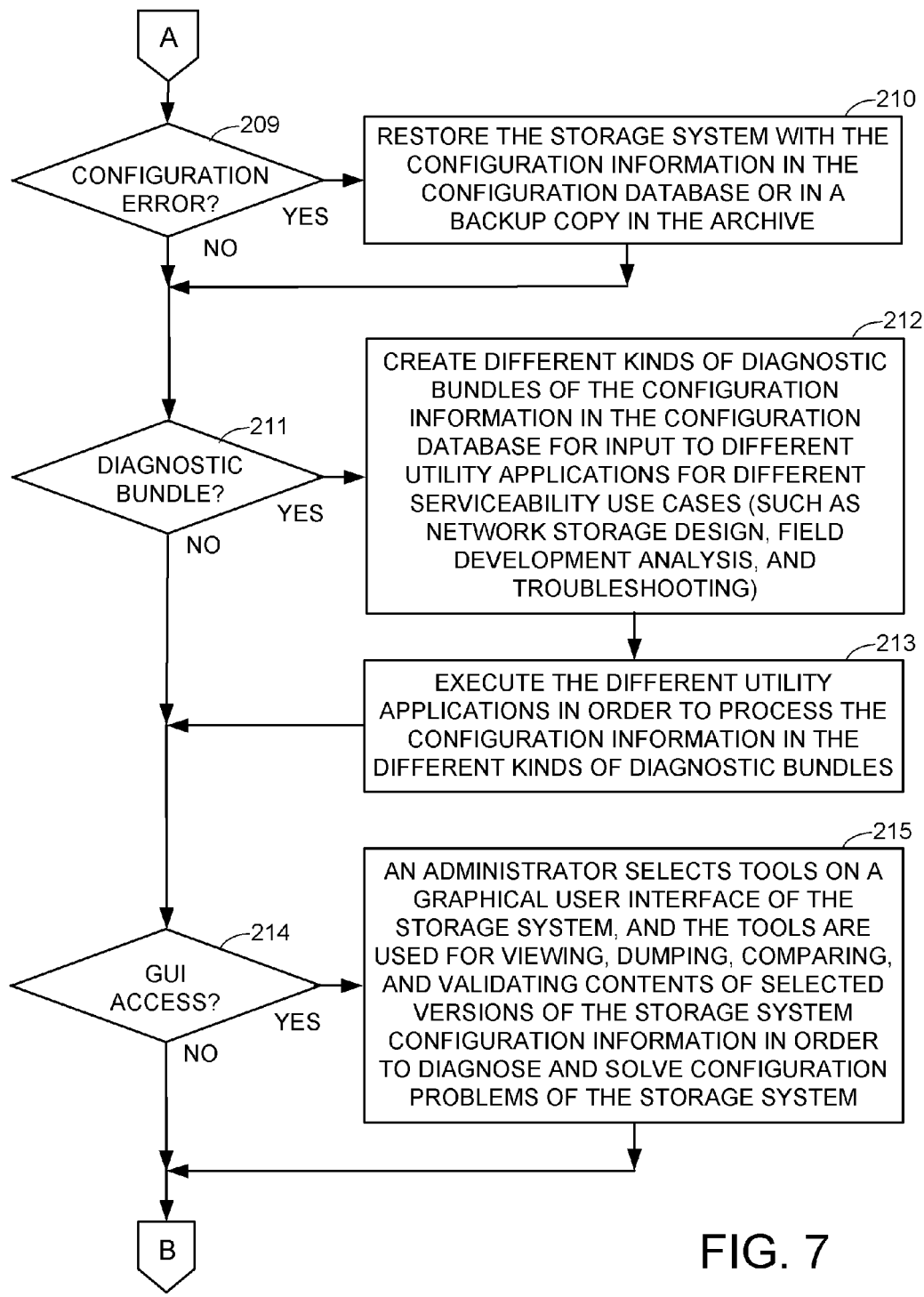

FIGS. 6 and 7 show a typical method of operation and use of the CCW warehouse service. In a first step 201, the collector engine (81 in FIG. 2) collects the configuration information about hardware and software of the storage system from multiple sources in the storage system, and stores the collected information in a configuration database (CCW database 56 in FIG. 2) having an extensible framework in storage of the file server. The CCW warehouse service also provides common application program interfaces (API 92, 93, 94, 95 in FIG. 3) in the storage system for storage utility applications (65, 66, 67, 68 in FIG. 3) to access the configuration database.

In step 202, if there is a configuration change, then execution branches to step 203 to update the configuration database with new configuration information. In step 204, the subscription service program of the distributor (85 in FIG. 3) is invoked to distribute configuration information to a subscriber when the new configuration information is found to include a change of interest to the subscriber. Execution continues from step 204 to step 205. Execution also continues from step 202 to step 205 when a configuration change does not occur.

In step 205, if it is time to archive the configuration of the storage system, then execution branches to step 206. In step 206, the system backup tool (161 in FIG. 5) creates a backup bundle of the configuration information in the configuration database, and this backup bundle is stored in the CCW archive, in order to create an archive of different versions of the configuration information having been stored in the configuration database. Execution continues from step 206 to step 207. Execution also continues from step 205 to step 207 when it is not time to archive.

In step 207, if the administrator invokes the system backup tool (161 in FIG. 5), then execution continues to step 208. In step 208, a backup bundle of the configuration information in the configuration database is created for restoration or repair of the storage system. This backup bundle can be added to the CCW archive and then used for restoration, or this backup bundle can exported from the storage system and imported into a repair application. Execution continues from step 208 to step 209 of FIG. 7. Execution also continues from step 207 to step 209 if the administrator has not invoked the system backup tool.

In step 209 of FIG. 7, if a configuration error is detected, then execution branches to step 210. In step 210, the file server is restored with the configuration information in the configuration database or in a backup copy in the archive. Execution continues from step 210 to step 211. Execution also continues from step 209 to step 211 if a configuration error has not been detected.

In step 211, if a diagnostic bundle is requested, then execution branches to step 212. In step 212, the bundler program of the distributor (85 in FIG. 3) creates one or more of different kinds of diagnostic bundles of the configuration information in the configuration database for input to one or more different utility applications for different serviceability use cases, such as network storage design, field development analysis, and troubleshooting. Execution continues from step 212 to step 213. In step 213, one or more of the different utility applications are executed in order to process the configuration information in one or more of the different kinds of diagnostic bundles. Execution continues from step 213 to step 214. Execution also continues from 211 to step 214 if a diagnostic bundle is not requested.

In step 214, if the administrator invokes the GUI (109 in FIG. 4) to access the configuration warehouse tools, then execution branches to step 215. In step 215, the administrator selects tools on the graphical user interface of the storage system and the tools are used for viewing, dumping, comparing, and validating contents of selected versions of the storage system configuration information in order to diagnose and solve configuration problems of the storage system. After step 215, execution loops back to step 202 in FIG. 6. Execution also loops from step 214 back to step 202 if the GUI has not been invoked to access the configuration warehouse tools.

What is claimed is:

1. A method of managing configuration information in a network storage environment, the method comprising a data processor of a storage system executing computer instructions stored on a non-transitory computer readable storage medium to perform the steps of:
- (a) collecting dynamic and static configuration information about hardware and software of the storage system from multiple sources in the storage system:
- (b) storing the collected configuration information in a configuration database in storage of the storage system;
- (c) providing common application program interfaces (API) for storage utility applications to access the configuration database;
- (d) creating configuration backup bundles from the configuration information in the configuration database for restoration or repair of the storage system; and
- (e) creating different kinds of diagnostic bundles of the collected configuration information for input to different utility applications for different serviceability use cases.

2. The method as claimed in claim 1, wherein the multiple sources in the storage system include sources of configuration information about a storage platform, storage system devices, storage system firmware, an operating system, application programs, and runtime data.

3. The method as claimed in claim 1, wherein the configuration database has an extensible framework allowing clients to access the configuration information in the configuration database through a version-based application program interface (API).

4. The method as claimed in claim 1, wherein the different serviceability use cases include network storage design to adapt the storage system to needs of a customer, field development analysis to determine what features are used by customers and how features used by the customers are configured, and troubleshooting, and
the method further includes executing the different utility applications in order to process the configuration information in the different kinds of diagnostic bundles.

5. The method as claimed in claim 1, which further includes storing the configuration backup bundles of the configuration information in order to create an archive of different versions of the configuration information having been stored in the configuration database.

6. The method as claimed in claim 1, which further includes an administrator selecting tools on a graphical user interface of the storage system, and the data processor of the storage system executing computer instructions of the selected tools for viewing, dumping, comparing, and validating contents of selected versions of the collected configuration information of the storage system in order to diagnose and solve configuration problems of the storage system.

7. The method as claimed in claim 1, which further includes the data processor executing computer instructions of a subscription service program to perform a step of distributing configuration information to a subscriber when the collected configuration information is found to include a configuration change of interest to the subscriber.

8. A computer program product comprising a non-transitory computer readable storage medium storing computer instructions that when executed by a data processor of a storage system perform the steps of:
- (a) collecting dynamic and static configuration information about hardware and software of the storage system from multiple sources in the storage system,
- (b) storing the collected configuration information in a configuration database in storage of the storage system;
- (c) providing common application program interfaces (API) for storage utility applications to access the configuration database;
- (d) creating configuration backup bundles from the configuration information in the configuration database for restoration or repair of the storage system; and
- (e) creating different kinds of diagnostic bundles of the collected configuration information for input to different utility applications for different serviceability use cases.

9. The computer program product as claimed in claim 8, wherein the multiple sources in the storage system include sources of configuration information about a storage platform, storage system devices, storage system firmware, an operating system, application programs, and runtime data.

10. The computer program product as claimed in claim 8, wherein the configuration database has an extensible framework allowing clients to access the configuration information in the configuration database through a version-based application program interface (API).

11. The computer program product as claimed in claim 8, wherein the computer instructions, when executed by the data processor, further perform a step of storing the configuration backup bundles in order to create an archive of different versions of the configuration information having been stored in the configuration database.

12. The computer program product as claimed in claim 8, wherein the computer instructions, when executed by the data processor, further present a menu of the tools to an administrator at a graphical user interface and enable the administrator to view, dump, compare, and validate contents of selected versions of the collected configuration information in the storage of the storage system in order to diagnose and solve configuration problems of the storage system.

13. The computer program product as claimed in claim 8, wherein the computer instructions further include a subscription service program that, when executed by the data processor, performs a step of distributing configuration information to a subscriber when the collected configuration information is found to include a configuration change of interest to the subscriber.

14. A storage system comprising:
at least one array of data storage devices, and
at least one server computer coupled to said at least one array of data storage devices for servicing client requests for access to data stored in said at least one array of data storage devices;
wherein the data storage system includes a data processor and non-transitory computer readable storage medium coupled to the data processor and storing computer instructions that when executed by the data processor perform the steps of:
- (a) collecting dynamic and static configuration information about hardware and software of the storage system from multiple sources in the storage system:
- (b) storing the collected configuration information in a configuration database in storage of the storage system;
- (c) providing common application program interfaces (API) for storage utility applications to access the configuration database;
- (d) creating configuration backup bundles from the configuration information in the configuration database for restoration or repair of the storage system; and
- (e) creating different kinds of diagnostic bundles of the collected configuration information for input to different utility applications for different serviceability use cases.

15. The storage system as claimed in claim 14, wherein the multiple sources in the storage system include sources of configuration information about a storage platform, storage system devices, storage system firmware, an operating system, application programs, and runtime data.

16. The storage system as claimed in claim 14, wherein the configuration database has an extensible framework allowing clients to access the configuration information in the configuration database through a version-based application program interface (API).

17. The storage system as claimed in claim 14, wherein the different serviceability use cases include network storage design to adapt the storage system to needs of a customer, field development analysis to determine what features are used by customers and how features used by the customers are configured, and troubleshooting.

18. The storage system as claimed in claim 14, wherein the computer instructions, when executed by the data processor, further perform a step of storing the configuration backup bundles of the configuration information in order to create an archive of different versions of the configuration information having been stored in the configuration database.

19. The storage system as claimed in claim 14, which further includes a graphical user interface, and wherein the computer instructions, when executed by the data processor, enable an administrator to select tools on the graphical user interface for viewing, dumping, comparing, and validating contents of selected versions of the collected configuration information of the storage system in order to diagnose and solve configuration problems of the storage system.

20. The storage system as claimed in claim 14, wherein the computer instructions include a subscription service program that, when executed by the data processor, performs a step of distributing configuration information to a subscriber when the collected configuration information is found to include a configuration change of interest to the subscriber.

\* \* \* \* \*